US005643054A

United States Patent [19]
Bach et al.

[11] Patent Number: 5,643,054
[45] Date of Patent: Jul. 1, 1997

[54] MACHINE PART WITH IMPROVED SURFACE TEXTURE FOR ROLLING CONTACT AND/OR SLIDING CONTACT

[75] Inventors: Peter Bach, Herzogenaurach; Ludwig Kern, Erlangen; Ernst Strian, Kunreuth, all of Germany

[73] Assignee: INA Wälzlager Schaeffler KG, Herzogenaurach, Germany

[21] Appl. No.: 610,711

[22] Filed: Mar. 4, 1996

[30] Foreign Application Priority Data

Apr. 7, 1995 [DE] Germany ............... 195 13 254.8

[51] Int. Cl.⁶ .................................................. B24B 1/00
[52] U.S. Cl. ..................... 451/34; 451/28; 451/49; 451/51; 451/57; 384/492; 384/490; 384/569
[58] Field of Search ................................ 451/49, 57, 28, 451/51, 34; 384/490, 492, 569

[56] References Cited

U.S. PATENT DOCUMENTS

| | | | |
|---|---|---|---|
| 3,579,933 | 5/1971 | Snell | 451/34 |
| 5,064,298 | 11/1991 | Hibi et al. | 384/625 |
| 5,331,775 | 7/1994 | Carmichael et al. | 451/57 |
| 5,333,954 | 8/1994 | Noguchi et al. | 384/492 |
| 5,397,188 | 3/1995 | Yoshizuka et al. | 384/492 |
| 5,456,538 | 10/1995 | Honda et al. | 384/569 |
| 5,520,987 | 5/1996 | Narai et al. | 384/492 |

FOREIGN PATENT DOCUMENTS

| | | | |
|---|---|---|---|
| PS 19 33 680 | 3/1973 | Germany. | |
| 23 53 928 A1 | 5/1975 | Germany. | |
| 33 26 316 C2 | 7/1987 | Germany. | |
| 35 24 412 C2 | 2/1993 | Germany. | |
| 43 26 768 A1 | 2/1995 | Germany. | |
| 0220720 | 9/1989 | Japan | 384/492 |
| 2216200 | 10/1989 | United Kingdom | 384/492 |
| 2219359 | 12/1989 | United Kingdom | 384/492 |

OTHER PUBLICATIONS

BRM Catalog—The necessity of a Plateaued Cylinder Wall Finish May 1979.

Primary Examiner—Robert A. Rose
Assistant Examiner—George Nguyen
Attorney, Agent, or Firm—Henry M. Feiereisen

[57] ABSTRACT

A machine part includes a surface suitable for rolling contact and/or sliding contact on another machine pad and made by an at least two-stage honing process, with a first honing step effecting a surface texture exhibiting a plurality of peaks and a plurality of pits and defining a mean profile line, and a second honing step for removal of the peaks to a level of the mean profile line for forming a plateau-like tenure that is interrupted by crossing pits, whereby the depth of the pits from the first honing step is maintained. Subsequently, abrasive grain is pushed into the surface for creating a crater-like recess, thereby displacing material at random in horizontal and venial directions for at least partially closing the pits. Mounds created during material displacement and positioned above the mean profile line are removed through a subsequent polishing process.

9 Claims, 2 Drawing Sheets

MACHINE PART WITH IMPROVED SURFACE TEXTURE FOR ROLLING CONTACT AND/OR SLIDING CONTACT

BACKGROUND OF THE INVENTION

The present invention refers to a machine part with improved surface texture for rolling contact and/or sliding contact.

It is generally known to utilize a plateau- (or flat-) honing process to provide a surface with a plateau-like texture which is interrupted by pits that cross each other and are formed by an at least two-stage honing process. In a first honing step, the surface is honed to exhibit peaks and pits, with the peaks being removed during the second honing step to a mean profile line so as to form the plateau-like texture, with the depth of the pits formed during the first honing step being maintained. Such plateau-like surface textures are used primarily during finishing of cylinder bores in motor blocks of Otto engines or diesel engines for improving the running properties of the cylinder face (VDI-Z 125 (1983) No. 14, July (II), page 995 ff., entitled "Fachgebiete in Jahresübersichten: Honen"). The improvement of the running properties is based on the enhanced oil retention capability of the pits that cross each other.

A drawback of configuring the surfaces with a plateau-like structure is their inability to fulfill their objective under certain circumstances, especially in those cases when such surfaces are subject to highest loads and their lubrication is insufficient during simultaneous rolling and sliding contacts. In those cases, the surfaces do not have the required durability and become damaged.

SUMMARY OF THE INVENTION

It is an object of the present invention to provide a machine part with improved surface texture obviating the afore-stated drawbacks.

In particular, it is an object of the present invention to provide a machine part with improved surface texture that exhibits a topography of the top layer that prevents breakdown and is of enhanced durability even at high load-carrying capability and under highest loads during combined rolling and sliding contacts and insufficient lubrication.

These objects and others which will become apparent hereinafter are attained in accordance with the present invention by subjecting the surface to an at least two-stage honing process to form a surface of plateau-like texture that is interrupted by pits which cross each other, and by pushing abrasive grain or grit against the surface of the plateau-like texture to create a crater-like recess, thereby displacing material at random in horizontal and vertical directions for at least partially closing the pits and forming above the mean profile line mounds which are removed through a subsequent polishing process.

Examples for use as abrasive grain include a corundum ($Al_2O_3$) grain.

Through plateau-honing, the surface peaks as formed during the first honing step are removed to the level of the mean profile line, resulting in a plateau-like texture which is characterized by a high material fraction while exhibiting significantly reduced surface roughness so that the load-carrying capability is high. On the other hand, the lubricant sump that is formed by the intersecting pits is changed by the material displacement in such a manner that the partial or complete sealing of the pits eliminates an uncontrolled leaking of the lubricant. The closing of the pits is not affected by the subsequent polishing process as the material deposits within the pits are formed below the mean profile line and thus cannot be smoothened out. Only mounds above the mean profile line are polished and ground away.

During the first honing step, the initial surface texture of the machine part is entirely eliminated, i.e. ground marks are for example completely eliminated by removing material from the surface up to the level of the pits formed by the ground marks. The surface texture after the first honing step exhibits peaks and pits and is defined by the mean profile line. Subsequently, the second honing step forms the plateau-like structure by utilizing a honing stone of significantly smaller graining to effect a removal of the peaks to the level of the mean profile line. The formed plateau-like structure is of reduced surface roughness and exhibits a high load-carrying capability as well as a crossing structure of the pits slantingly to the axis in correspondence to the graining of the first honing step. By setting kinematic parameters of the honing process such as speed of the workpiece, frequency of oscillation and oscillation stroke, and by selecting a respective graining of the honing stones, the desired texture can be influenced in many ways. Subsequently, as third step, the temporary impacting of abrasive grain effects the described material displacement for at least partially filling or sealing the intersecting pits.

According to another feature of the present invention, the surface exhibits a plurality of minute recesses positioned at random, with an area ratio between the pits and the recesses being approximately 1:1, and with a ratio of a total area of the pits and the recesses in relation to a total surface area amounting to below 15%. These minute recesses also serve as oil sump which substantially prevents an escape of oil in rolling direction as well as in a direction perpendicular thereto. The formation of such recesses is known per se and disclosed e.g. in German Pat. No. 41 14 513.

Preferably, the surface has a top layer which has a compressive stress in opposition to the Hertzian stress of up to $1000N/mm^2$ up to a depth of 100 μm, whereby the maximum compressive stress may be effected directly on the surface or up to the depth of 100 μm. Such an internal stress results in a reduction of the effective transverse loads and tensile stress in the material so that micropeeling and cracks are not experienced.

The defined internal compressive stress that is suited to the magnitude and pattern of the load is generated by blasting units as typically used in connection with shot-blasting e.g. by blowing a number of globules by a jet of compressed air from a nozzle at great inertia against the surface of the workpiece being machined. In dependence on preselected parameters such as diameter of the globules, material of the globules and impacting speed against the surface of the workpiece, the desired internal stress can then be produced. Also, blasting by way of a water jet against the surface is conceivable.

Suitably, the surface of a roller of a cam follower and/or the surface of a cam is formed with the texture according to the present invention in order to prevent in valve drives of internal combustion engines breakdowns at high loads through superimposed conditions based on rolling and sliding contacts in combination with insufficient lubrication.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
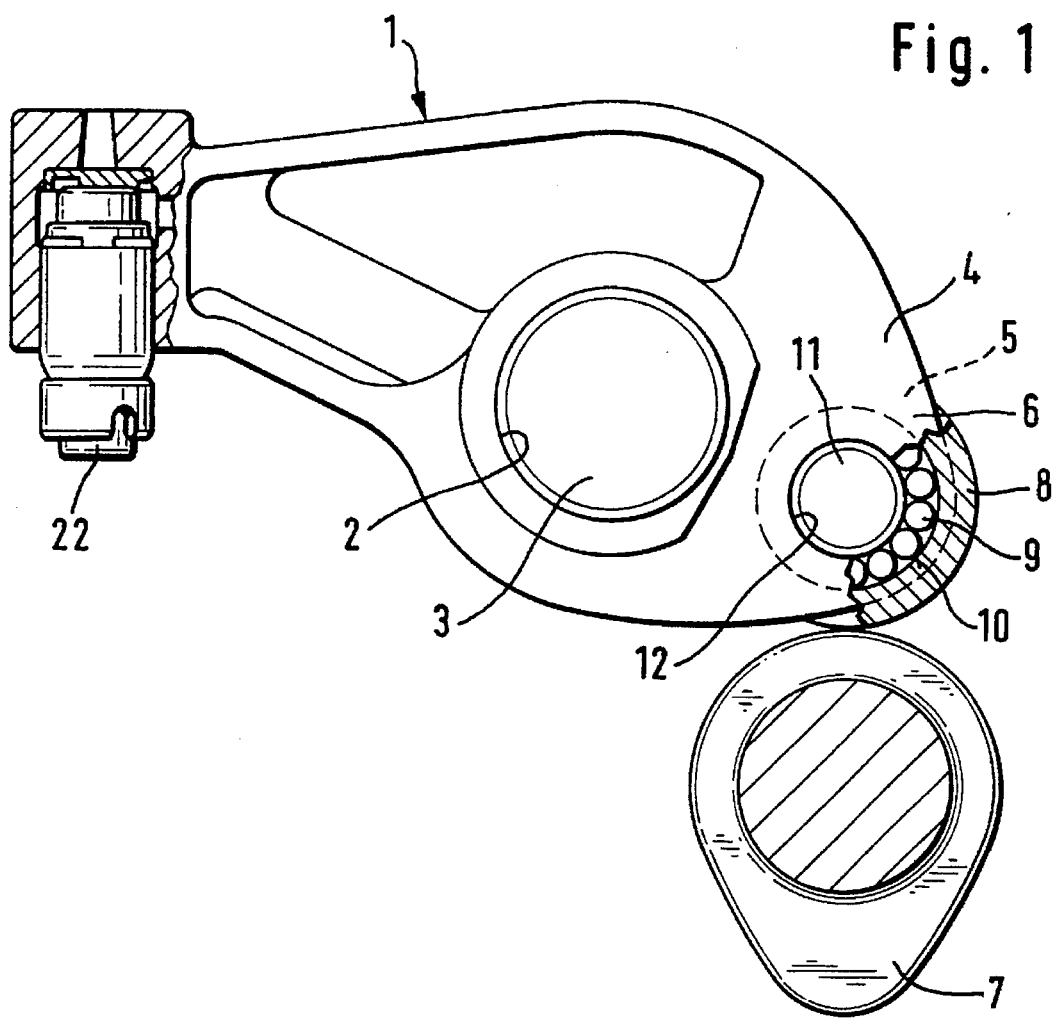
FIG. 1 is a partially sectional side view of a cam follower arrangement.

Throughout all the Figures, the same or corresponding elements are always indicated by the same reference numerals.

Turning now to the drawing, and in particular to FIG. 1, there is shown a partially sectional side view of a cam follower as used e.g. in an engine with overhead camshaft arrangement, including a rocker arm 1 which pivots about a rocker shaft 3 received in a through-bore 2 of the rocker arm 1. At one end thereof, the rocker arm 1 is formed with a section 4 exhibiting a recess 5 which is formed between two parallel sidewalls 6. Received in the recess 5 is a roller 8 which has an outer peripheral surface 13 (FIG. 2) in rolling contact with a cam 7. The roller-distal end of the rocker arm 1 is in contact with the valve stem 22 of a valve to open and close the valve as the cam 7 rotates and the rocker arm 1 rocks.

Figure 2:
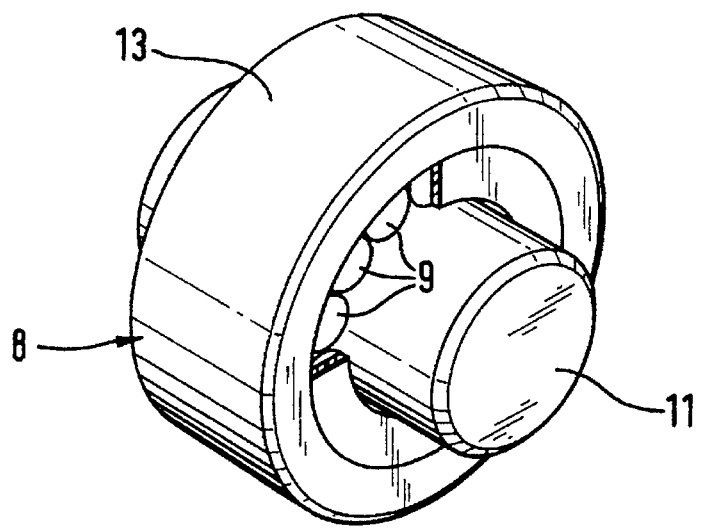
FIG. 2 is a perspective illustration of a roller being acted upon by a cam.

As shown in particular in FIG. 2, the roller 8 is rotatably mounted on a shaft 11 via a plurality of bearing needles 9 which form a needle rim that is positioned in a central bore 10 between the shaft 11 and the roller 8. The shaft 11 is secured on both axial ends in respective bores 12 of the sidewalls 6 and forms the inner race for the bearing needles 9.

Figure 3:
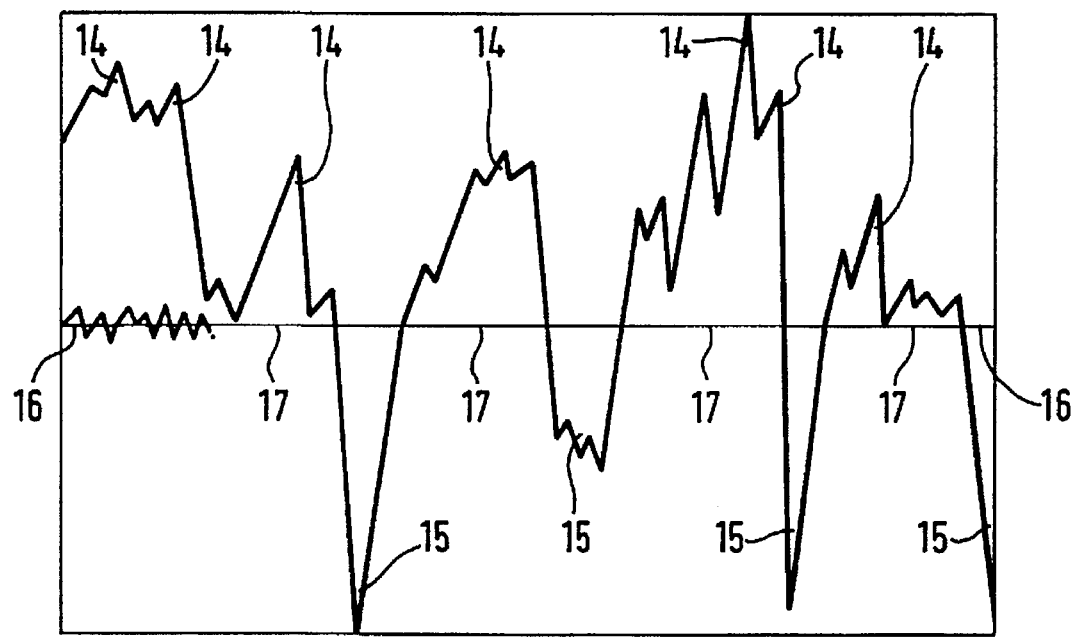
FIG. 3 is an enlarged and simplified illustration of the surface of the roller of FIG. 2, after being subject to a two-stage honing process.

Turning now to FIG. 3, there is shown an enlarged and simplified illustration of the outer peripheral surface 13 of the roller 8 after being subject to a two-stage honing process. Honing is a process by which small amounts of material are removed from a cylindrical surface by means of abrasive stones. During the first honing step, a machine part e.g. the roller 8, is honed to create a surface texture exhibiting peaks 14 of different heights and valleys (or pits) 15 of different depth, with the distance between the highest peak 14 and the deepest pit 15 representing the surface roughness. In a second step, the surface is machined in such a manner that the peaks 14 are reduced to the level of a mean (or average) profile line 16 to effect a structure as schematically indicated on the left-hand side in FIG. 3. The leveling of the peaks 14 that are formed following the first honing step is accomplished by the second honing step while the configuration of the pits 15 is not effected thereby. Thus, the running surface is formed with several plateaus 17 which exhibit a significantly reduced roughness compared to the surface finish after the first honing step. The plateaus 17 exhibit a relatively even running surface of considerable load-carrying capability, with the retained pits 15 that are formed after the first honing step allowing accumulation of sufficient amounts of lubricant which increase with increasing depth of the pits 15.

Figure 4:
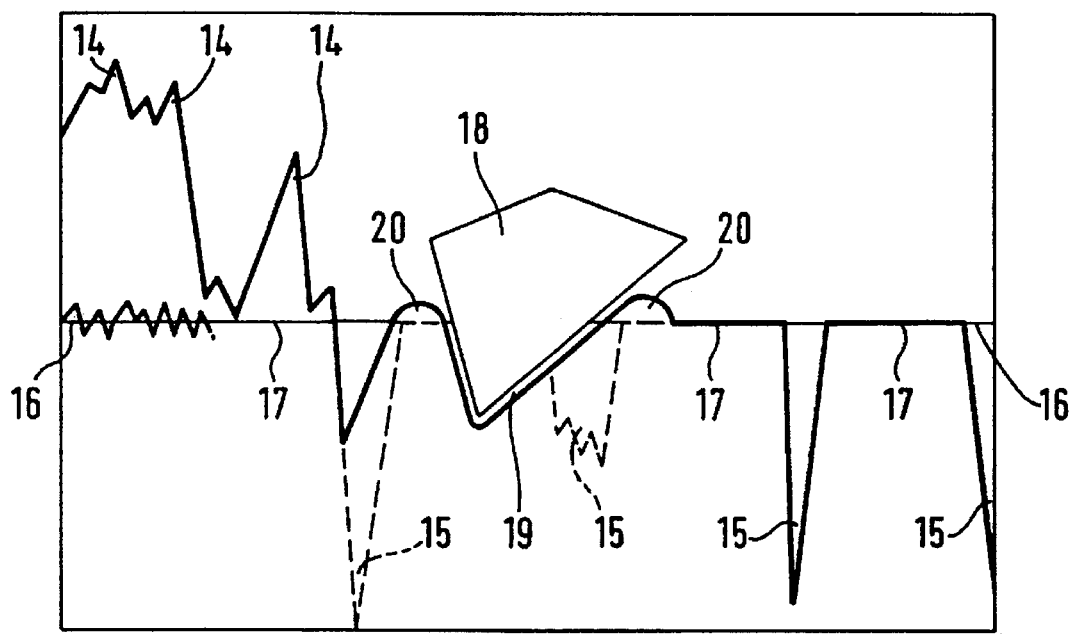
FIG. 4 is an enlarged and simplified sectional view of the surface of the roller following the second honing step of the two-stage honing process and during impression by abrasive grain, for illustration of a surface texture according to the present invention.

The two-stage honing process is followed, in accordance with the present invention, by a further finishing process in which abrasive grain or grit 18 is pushed into a plateau 17, as shown in FIG. 4. A suitable process is for example polishing e.g. in polishing drums using abrasive material and polishing agents. The penetration of abrasive grain 18 into the outer peripheral surface 13 of the roller 8 creates a crater-like recess 19 so that material of the former plateau 17 is displaced in horizontal and vertical directions. As a consequence, neighboring pits 15 are partially or completely filled by the displaced material and their longitudinal dimension is reduced so that an uncontrolled escape of lubricant is prevented. In addition, material displacement by the abrasive grain 18 creates also mounds 20 which are removed by a subsequent polishing process to the level of the mean profile line 16. The polishing process effects only the area above the mean profile line 16 and thus does not open any pits 15 that were filled during the impression of abrasive grain 18.

The outer peripheral surface 13 of the roller 8 thus has a texture, as shown in FIG. 4, with pits 15 which are oriented indentations of elongated configuration that cross each other, and with recesses 19 which are not oriented and do not exhibit an elongated configuration. The maximum surface roughness is 2.0 µm and the common area ratio of intersecting pits 15 and minute recesses 19 is 9%, with pits 15 exhibiting a width of about 2 µm and representing 4% of the total surface area while the surface recesses 19 have an area in a magnitude of 30 to 60 µm² and represent 5% of the total surface area. The outer peripheral surface 13 has a top layer which has a compressive stress in opposition to the Hertzian stress of up to 1000N/mm² up to a depth of up to 100 µm.

A cam follower that was equipped with a roller 8 according to the present invention was tested under highest loads. The test showed that, the outer peripheral surface 13 of the roller 8 did not encounter any peeling or cracks even when lubrication was insufficient.

Persons skilled in the art will understand that the surface finish according to the present invention for rolling contact and/or sliding contact is not limited to rollers for use in cam followers of an internal combustion engine. Rather, any surface that effects a fluid flow without experiencing an escape of lubricant should be considered within the scope of the present invention.

While the invention has been illustrated and described as embodied in a machine part with improved surface texture for rolling contact and/or sliding contact, it is not intended to be limited to the details shown since various modifications and structural changes may be made without departing in any way from the spirit of the present invention.

What is claimed as new and desired to be protected by Letters Patent is set forth in the appended claims.

We claim:

1. A machine part having a surface suitable for rolling contact and/or sliding contact, said surface being made by an at least two-stage honing process, with a first honing step effecting a surface texture exhibiting a plurality of peaks and pits and defining a mean profile line, and a second honing step for removal of the peaks to a level of the mean profile line for effecting a plateau-like surface texture that is interrupted by pits intersecting each other, while maintaining the depth of the pits from the first honing step, and by pushing abrasive grain against the surface for creating a crater-like recess, thereby displacing material at random in horizontal and vertical directions for at least partially closing the pits to reduce their longitudinal dimension and thereby prevent an uncontrolled escape of lubricant, and forming above the mean profile line mounds which are removed through a subsequent polishing process.

2. The machine part of claim 1 wherein the surface exhibits a plurality of minute recesses positioned at random, with the pits and the recesses defining an area ratio of approximately 1:1, and with the pits and the recesses defining a surface area which is below 15% of a total surface area.

3. The machine part of claim 1 wherein the surface has a top layer which has a compressive stress in opposition to the Hertzian stress of up to 1000N/mm$^2$ up to a depth of 100 μm.

4. The machine part of claim 1 wherein said surface is part of a roller of a cam follower arrangement for rolling contact or sliding contact with a cam.

5. The machine part of claim 1 wherein said surface is part of a cam.

6. A machine part for use in rolling contact and/or sliding contact with another machine part, comprising an outer surface exhibiting a plateau-like texture with a plurality of longitudinal pits that cross each other and interrupt the plateau-like texture, and with a plurality of minute recesses positioned at random over the outer surface.

7. The machine part of claim 6 wherein the pits and the recesses define an area ratio of approximately 1:1, with the pits and the recesses defining a surface area which is below 15% of a total surface area.

8. The machine part of claim 6 wherein the surface has a top layer which has a compressive stress in opposition to the Hertzian stress of up to 1000N/mm$^2$ up to a depth of 100 μm.

9. A method of making a surface of a machine part for rolling contact and/or sliding contact upon another element; comprising the steps of:

honing an outer surface of the machine part to exhibit peaks and pits;

plateau-honing the surface through removal of the peaks to the level of a mean profile line for formation of plateaus that are interrupted by pits which cross each other;

pushing grit into the plateau-like configuration for displacing material, with displaced material being received and at least partially filling the pits, and forming mounds above the mean profile line; and removing the mounds to a level of the mean profile line without altering the configuration of the pits.

* * * * *